(12) United States Patent
Pearson

(10) Patent No.: US 6,941,372 B2
(45) Date of Patent: Sep. 6, 2005

(54) MOBILE COMMUNITY COMMUNICATOR

(75) Inventor: Anthony Pearson, Allentown, PA (US)

(73) Assignee: Agere Systems Inc., Allentown, PA (US)

(*) Notice: Subject to any disclaimer, the term of this patent is extended or adjusted under 35 U.S.C. 154(b) by 787 days.

(21) Appl. No.: 09/773,955

(22) Filed: Feb. 1, 2001

(65) Prior Publication Data

US 2002/0103863 A1 Aug. 1, 2002

(51) Int. Cl.⁷ .............................................. G06F 15/16
(52) U.S. Cl. ........................ 709/227; 709/203; 709/204; 709/228; 709/229
(58) Field of Search ................................. 709/200–253

(56) References Cited

U.S. PATENT DOCUMENTS

| | | | | |
|---|---|---|---|---|
| 5,956,648 A | * | 9/1999 | Brennan et al. | 455/518 |
| 6,081,830 A | * | 6/2000 | Schindler | 709/204 |
| 6,260,012 B1 | * | 7/2001 | Park | 704/236 |
| 6,363,258 B1 | * | 3/2002 | Schmidt et al. | 455/514 |
| 6,647,270 B1 | * | 11/2003 | Himmelstein | 455/456.1 |
| 6,788,667 B1 | * | 9/2004 | Beresin | 370/338 |
| 2002/0078154 A1 | * | 6/2002 | Djennane et al. | 709/205 |

* cited by examiner

Primary Examiner—Nabil El-Hady

(57) ABSTRACT

An apparatus, system and method for enabling individuals to communicate with each other to discuss predetermined topics of interest (e.g., health and fitness, weather, politics, science, etc.). In one embodiment, a mobile communicator enables a user to communicate with other participants on various predefined topics within a predetermined range of the device (e.g., five to ten miles). The mobile communicator includes a full-duplex transceiver which is able to send and receive signals on one or more channels, each channel corresponding to a predefined generic topic of interest. The mobile communicator further includes a channel selector operatively coupled to the transceiver for selecting a particular one of the transceiver channels and a corresponding discussion topic. In an illustrative application, the user selects a channel and may then participate in a discussion whose topic or subject matter corresponds to the selected channel. In this manner, the present invention enables users to participate in group discussions according to topic while the participants/users are engaged in a mobile activity, such as biking, driving, jogging, etc.

19 Claims, 2 Drawing Sheets

MOBILE COMMUNITY COMMUNICATOR

FIELD OF THE INVENTION

The present invention relates generally to communication systems, and more specifically relates to techniques for enabling discussions among multiple users relating to predefined topics of interest.

BACKGROUND OF THE INVENTION

The Internet (e.g., World Wide Web) has enabled persons from all over the world to communicate with others who share a common interest. For example, Internet chat rooms are a well-established means for persons to engage in group discussions relating to varying topics or issues. There are numerous chat rooms, each focusing on a particular topic in a free-form, unmoderated interaction format. To participate in a chat room discussion, however, requires accessibility to a computer and an Internet Service Provider (ISP) connection. Moreover, Internet chat room discussions are essentially text-based only.

Telephone systems, including teleconferencing equipment and the like, allow multiple participants to remotely converse with each other in a conference call via a dedicated communication channel, without the need for a computer or ISP connection. Individual participants, however, cannot choose and/or selectively change discussion groups (and therefore discussion topics) in a fashion similar to that of an Internet-based chat room.

Another more portable means by which group conversation is conventionally facilitated, without the need for a computer and Internet connection, is through the use of two-way radios. Two-way radios, however, only allow a single person to communicate at one time while a transceiver button is depressed. Generally, two-way radios require a user to manually depress a "transmit" button or switch, thus essentially cutting off communication from others while the button remains in the "transmit" position. Additionally, conventional two-way radios lack a mechanism for partitioning discussions according to an individual topic (e.g., sports, health and fitness, weather, politics, science, etc.) assigned to a channel, which users can then select or change as desired.

Conventional communication systems and methods do not address the above-identified problems and issues. Accordingly, there is a need in the field of communication systems for techniques for enabling discussions among multiple users relating to predefined topics of interest (e.g., voice as well as text-based) while engaged in a mobile activity, such as biking, driving, jogging, etc. Furthermore, it would be desirable if such communication system, device and/or method could provide hands-free operation, for example by including voice recognition capability. Conventional communication systems and devices, such as two-way radios, cellular telephones, and the like, are not configured nor are they utilized in a manner that promotes community and conferencing.

SUMMARY OF THE INVENTION

The present invention provides techniques for enabling individuals to communicate with each other to discuss predetermined topics of interest (e.g., sports, health and fitness, weather, politics, science, etc.). A mobile community communicator device in accordance with an illustrative embodiment of the invention includes a full-duplex transceiver which is able to send and receive signals on one or more channels, each channel corresponding to a predefined generic topic of interest. The mobile communicator in the illustrative embodiment further includes a channel selector operatively coupled to the transceiver for selecting a particular one of the transceiver channels and a corresponding discussion topic. In an exemplary application, the user selects a channel and may then participate in a discussion whose topic or subject matter corresponds to the selected channel. In this manner, the present invention enables users to participate in group discussions according to topics of interest while the participants/users are engaged in a mobile activity, such as biking, driving, jogging, etc.

In one aspect of the invention, the mobile communicator device includes voice recognition capability to provide a user with hands-free operation. The voice recognition circuitry is preferably responsive to the user's voice or other sounds for automating one or more functions of the mobile communicator. For example, a user's voice may activate the transceiver to automatically start transmitting the user's voice signal to other participants in the discussion, without the user manually activating a transmit button, switch, or equivalent mechanism. Furthermore, the voice recognition circuitry may be responsive to one or more spoken commands, for example, to select a channel or raise/lower a volume setting.

In a second aspect of the present invention, the mobile communicator preferably includes one or more discussion channels that are "open" (e.g., not predefined), thereby allowing a user to customize or otherwise configure the mobile communicator according to his or her own interests (e.g., gardening, cooking, pets, etc.). These open channels may be changed to correspond to a new discussion topic as desired.

In a third aspect of the present invention, the mobile communicator further includes an indicator (e.g., audible, visual and/or tactile), such as, for example, a speaker, liquid crystal display (LCD), or vibrating transducer. The indicator preferably provides information of interest to the user, such as a verification of the selected channel and the discussion topic assigned to the selected channel, the number of users participating in the discussion, whether the device is within operational range of a selected discussion, etc. The indicator may further provide an audible, visual and/or tactile indication whenever a participant enters and/or exits the discussion.

These and other objects, features and advantages of the present invention will become apparent from the following detailed description of illustrative embodiments thereof, which is to be read in connection with the accompanying drawings.

DETAILED DESCRIPTION OF THE INVENTION

Figure 1:
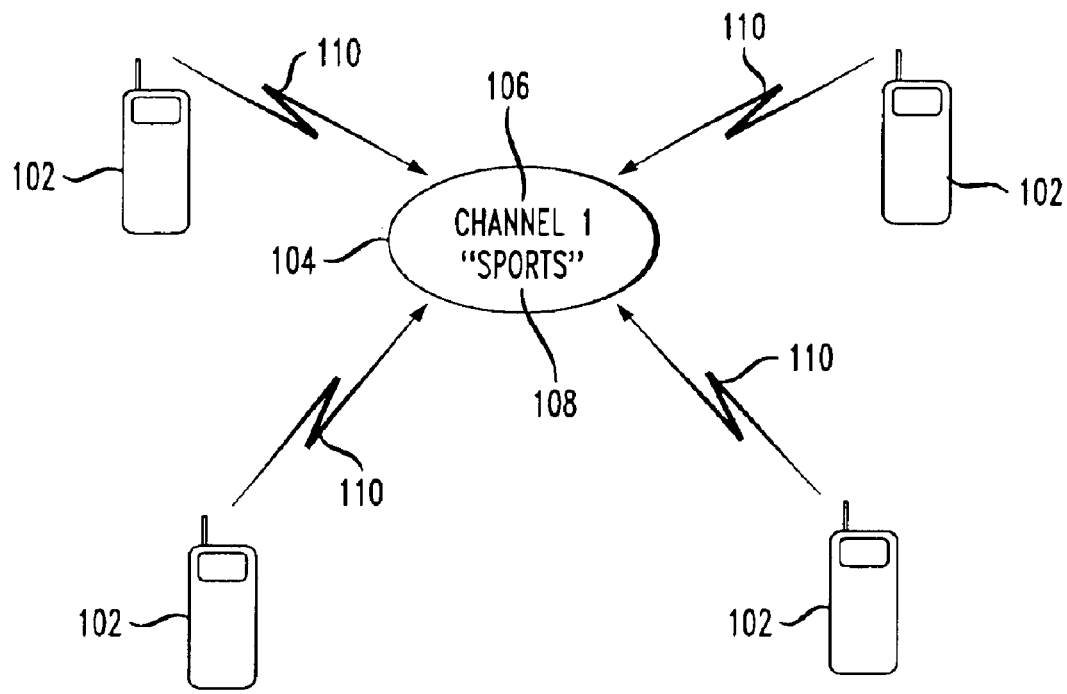
FIG. 1 is a block diagram depicting a mobile communicator system, formed in accordance with an illustrative embodiment of the present invention.

The present invention will be described herein in the context of a mobile communicator system 100, an example of which is illustrated in FIG. 1. It should be appreciated, however, that the system of the present invention has wide applicability for providing a mechanism by which two or more participants or other users, each utilizing a mobile community communicator 102, formed in accordance with the present invention, may participate in a group discussion 104 by selecting a predefined channel 106 corresponding to a generic or customized topic of interest 108. The present invention enables a user, via a conventional communication connection 110, to participate in such discussions while engaged in a mobile activity, such as driving, biking, running, etc. The connection 110 is preferably a wireless communication link as is typically used by two-way radio systems and the like, but may also include numerous other suitable connections, including, for example, a satellite link, cellular link, dedicated connection, etc., as understood by those skilled in the art.

It is to be appreciated that the term "mobile communicator" as used herein is intended to refer to a portable communication device, unit or other mechanism, formed in accordance with the present invention, and may include, for example, a conventional cellular phone, personal digital assistant (PDA), etc. that has been modified in accordance with the present invention to perform the unique features of the invention, as set forth herein.

Figure 2:
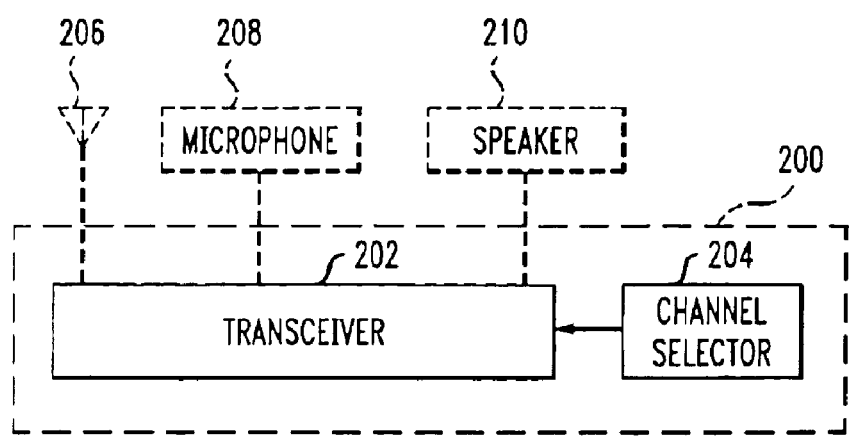
FIG. 2 is a block diagram depicting an illustrative embodiment of a mobile communicator device of the system shown in FIG. 1, formed in accordance with an illustrative embodiment of the present invention.

FIG. 2 illustrates a block diagram of an illustrative embodiment of the mobile communicator device 200, formed in accordance with the present invention. As shown in FIG. 2, the mobile communicator 200 may correspond to any one or more of the devices 102 depicted in FIG. 1 and includes a transceiver 202 and a channel selector 204 operatively coupled to the transceiver 202. It is to be appreciated that the term "transceiver" as used herein is intended to include both transmitter and receiver circuitry, as is conventionally employed by those skilled in the art. The transceiver 202 preferably operates in a full-duplex mode over a plurality of communication channels. Each of at least a subset of the channels is assigned to a predefined discussion topic which is preferably the same for all mobile communicator units. In this manner, mobile communicators operating on the same channel will know beforehand the discussion topic. Channel assignments are generally not able to be modified by the user, although the present invention contemplates that one or more user-assignable channels may be included in the mobile communicator 200. The channel selector 204 provides a mechanism whereby a user can selectively change channels (and therefore discussion topics) at any time, as desired.

With continued reference to FIG. 2, the mobile communicator 200 is operatively coupled to an antenna 206, which may be provided externally to the unit 200 (as shown) or it maybe integrated into the unit itself. As appreciated by those skilled in the art, the antenna is employed in a conventional fashion to radiate signals transmitted by the transceiver 202 and to receive signals transmitted by other mobile communicator units. Furthermore, the transceiver 202 is preferably operatively coupled to a microphone transducer 208 and a speaker or earpiece transducer 210, which may be either provided externally to the mobile communicator unit 200 (as shown), or included in the unit. The microphone 208 and speaker 210 are employed by the mobile communicator 200 in a conventional manner, as will be appreciated by those skilled in the art.

Figure 3:
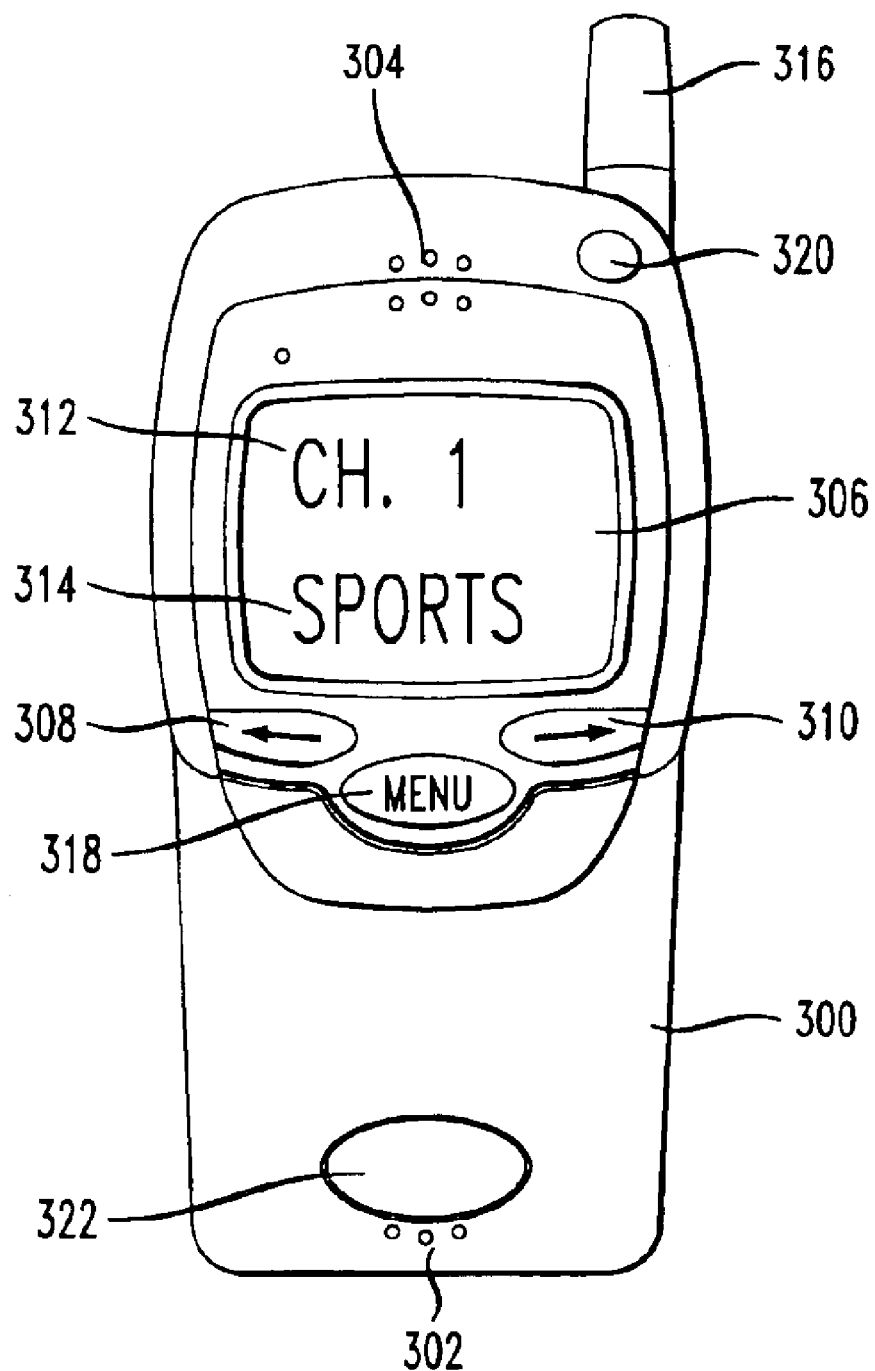
FIG. 3 is a front perspective view depicting an exemplary mobile communicator device, formed in accordance with an illustrative embodiment of the present invention.

With reference now to FIG. 3, an exemplary mobile communicator 300 formed in accordance with the present invention is shown. It is to be appreciated that the embodiment depicted in FIG. 3 is intended to be used for illustrative purposes only, and that other embodiments are similarly contemplated by the present invention. As shown in FIG. 3, the mobile communicator 300 preferably includes a microphone transducer 302, an earphone transducer 304, a display 306, channel selector buttons 308 and 310, an antenna 316, a menu button 318, a power button 320 and a mute button 322. These features will be described in further detail herein below.

The mobile communicator 300 is preferably sized and ergonomically shaped to be comfortably held in a user's hand, much like a cellular telephone or PDA, although the device may also be configured and sized for mounting, for example, on a user's vehicle (e.g., car, bicycle, etc). Moreover, the present invention further contemplates that the mobile communicator may be configured for attachment to the user's body, such as a wrist-mounted device, for example. The mobile communicator 300 is preferably a full-duplex device, thereby allowing a user to simultaneously speak and listen to other users conversing on a same communication channel, in a manner similar to a telephone, within the operating range of the device.

As stated herein above in connection with FIG. 2, a microphone transducer 302, or suitable equivalent thereof, and a speaker or earpiece transducer 304, or suitable equivalent thereof, are operatively included in the unit 300 and enable a user to speak and listen, respectively, to other participants in a discussion. The present invention further contemplates that a microphone transducer and speaker transducer may be provided externally to the mobile communicator 300, such as provided in a hands-free headset conventionally employed with a cellular telephone for example, which preferably integrates a microphone and one or more earphones. An external input/output jack or plug may be included that is operatively coupled to the mobile communicator for this purpose. In a preferred embodiment of the present invention, the mobile communicator 300 includes voice recognition circuitry which allows the user to automatically perform certain tasks, including, for example, changing channels and raising/lowering the volume, without manual intervention by the user. This voice recognition feature is particularly desirable in applications wherein the user does not have a free hand available to operate the unit. The voice recognition circuitry is also preferably employed in place of a transmit button or switch, thereby enabling the unit 300 to be automatically triggered by voice/sound communication.

The mobile communicator 300 includes transmitter circuitry and receiver circuitry, as previously described in conjunction with FIG. 2, and is preferably capable of wireless communication within a relatively local operational range, such as, for example, five to ten miles, although communication over longer or shorter distances is similarly contemplated by the present invention. By restricting the mobile communicator to operation within a local communication range, the need for bulky transmitter circuitry would be essentially eliminated, thus reducing the physical size and overall power consumption of the device. Furthermore, the size of any one discussion group will be more manageable by limiting the operating range of the device. If a user determines that a discussion group is too large, the present invention may include circuitry for further limiting both the receiving and transmitting range of the device, for example, to within one mile of other participants. This additional feature may be useful when the density of participants in a certain area is relatively high (e.g., a shopping mall, etc.). Similarly, the mobile communicator 300 may provide circuitry for increasing the operating range of the unit if a discussion group is deemed too small. This feature may be desirable in applications such as, for example, highway driving, where there is a low participant density or where the operating range of the device can change rapidly due to the speed of the vehicle. Signals are preferably received and transmitted via an antenna 316 included in the unit 300. The antenna 316 may be extendible/retractable or it may be fixedly mounted within the device 300, as appreciated by those skilled in the art. The unit 300 may also be capable of accepting an external antenna, for example, through an antenna jack or plug if the unit itself does not include an antenna, or possibly to extend the operating range of the unit.

The mobile communicator 300 includes at least one channel assigned to a preset or predefined discussion topic (e.g., sports, health and fitness, weather, politics, science, etc.). These preset channels are preferably standardized between mobile communicator units and are not accessible for reassignment by the user to a different discussion topic. Each mobile communicator 300 preferably includes a certain minimum set of predefined channels corresponding to topics of general interest to a large number of users. The mobile communicator 300 also preferably includes one or more "open" or "free" channels which are customizable by the user to a user's own particular interest(s) (e.g., gardening, cooking, pets, etc.) as desired. These user-customized channels may appeal to only a small number of users. To use an open channel for initiating a discussion, for instance, a user may enter that channel and inform all participants who subsequently join what the "current topic" of discussion is.

Each of the channels preferably has a unique frequency associated therewith, some of which may be essentially permanently allocated to a predetermined discussion topic, as previously described herein. Alternatively, the present invention contemplates that several physical channels can be allocated on one frequency, for example, on a time-sharing basis. Each physical channel would be defined by a fixed time-slot, as understood by those skilled in the art. In accordance with the present invention, a user may selectively change channels at any time, preferably using one or more channel selector buttons 308, 310, or a suitable equivalent channel selection means, located on the mobile communicator unit 300. In a preferred embodiment of the present invention, the unit 300 includes a "Channel Down" button 308 and a "Channel Up" button 310 which allows a user to scroll through a list of available channels and corresponding discussion topics. Alternatively, the unit 300 may include one or more channel selector buttons, each labeled (e.g., by discussion topic or channel number/name) and corresponding to an individual channel. Additionally, the mobile communicator 300 may include a numeric keypad (not shown) whereby a desired channel may be selected by directly entering the desired channel number on the keypad.

With continued reference to FIG. 3, a display 306, for example a liquid crystal display (LCD) or suitable equivalent thereof, is preferably included in the mobile communicator device 300. In combination with control circuitry included in the mobile communicator unit 300, which preferably includes a processor or analogous circuitry as known by those skilled in the art, the display 306 may operatively provide a visual indication of useful information for the user. For example, in a preferred embodiment of the present invention, the display 306 indicates the current channel 312 and corresponding preset discussion topic 314 that has been selected. The display 306 may also indicate the number of on-line participants in a selected discussion group that are within the operating range of the unit. This number may, of course, continually vary as discussion participants travel into and out of the operational range of the unit. Furthermore, the present invention preferably provides an indication, which may include an audible (e.g., beep, tone, etc.), visual (e.g., light, LCD display, etc.), and/or tactile (e.g., vibration, etc.) indication whenever a participant enters or exits a selected channel within the operating range of the device, in essence announcing to the other participants that a new participant has come on-line or that an existing participant has gone off-line, respectively. The on-line/off-line indication may preferably be suppressed and/or modified (particularly as to the form of indication) by the user as desired.

In another aspect of the present invention, in order for a user to conveniently change one or more settings and/or options of the mobile communicator, the unit 300 is preferably menu-driven and includes a menu button 318, or similar mechanism, for activating the menu. Menu options may include, for example, volume adjustment, setting of date/time (if such feature is included), open channel assignments, etc. The menu may similarly be used to change the operational mode of the device, such as to place the unit in a passive "listen only" mode, or to enable/disable voice recognition (if such feature is included). The menu options and corresponding settings are preferably controlled by a processor, or equivalent circuitry, and indicated visually on the display 306. These menu options and settings can be stored in a memory, preferably non-volatile. Menu items may be scrolled through and/or modified using the channel selector buttons 308, 310, for example, as understood by those skilled in the art. The display 306, menu button 318 and channel selector buttons 308, 310 may interface with the processor as input/output (I/O) devices It is to be appreciated that the term "processor," as used herein, is intended to include any processing device, such as, for example, one that includes a central processing unit (CPU) and/or other processing circuitry. It is also to be understood that the term "processor" may refer to more than one processing device and that various elements associated with a processing device may be shared by other processing devices. The term "memory," as used herein, is intended to include memory associated with a processor or CPU, such as, for example, random access memory (RAM), read only memory (ROM), a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, keypad, button, etc.) for entering data to the processing unit, and/or one or more output devices (e.g., display, printer, etc.) for presenting results associated with the processing unit.

It is to be appreciated that at least a portion of the methods of the present invention may be implemented by a software application program running on the processor. Accordingly, software components including instructions or code for preforming at least a portion of the methodologies of the invention, as described herein, may be stored in one or more of the associated memory devices (e.g., ROM, fixed or removable memory) and, when ready to be utilized, loaded in whole or in part (e.g., into RAM) and executed by a CPU.

As stated herein above, the mobile communicator 300 may include a date/time feature. Using this feature, the unit 300 may be configured to automatically activate in accordance with a schedule programmed by the user. In this manner, a user can automatically set the device to participate in periodic discussions on selected days/times and on selected channels. Moreover, using the timing circuitry required for the date/time feature, the device 300 may be easily configured by one skilled in the art to monitor the amount of time a user has participated in any one or more discussion sessions. This time may be stored, for example, in memory included in the device and a usage history profile can be easily obtained therefrom.

The present invention contemplates that certain discussion topics may involve mature subject matter that is not suitable for children, or may involve subject matter that is otherwise not intended for unauthorized individuals. Accordingly, the mobile communicator unit preferably allows each channel to be made individually inaccessible, such as, for example, by requiring a unique password, set by the user, to be entered prior to selecting the channel. This "lock-out" feature provides a user with an additional level of security should the device become available to unauthorized persons.

It is to be appreciated that the format of a discussion may be a free-form, unmoderated session, as is typically found in an Internet chat room. Alternatively, the discussion may be moderated by one or more participants, either self-designated or chosen by another participant in the discussion group. Users may choose to operate in essentially a passive mode by "listening in" to an on-going topical discussion, opting not to provide any comments relating to the discussion. In this passive mode of operation, the microphone 302 on the user's mobile communicator 300 is preferably muted or disabled, for example by a mute button 322 or suitable equivalent thereof, so that the participants in the discussion cannot hear the user's comments. Similarly, the user may disable the mobile communicator transmitter circuitry, for example by changing an option or setting displayed on-screen via the menu button 318, so that no comments or other background sounds are broadcast to the discussion participants.

Although illustrative embodiments of the present invention have been described herein with reference to the accompanying drawings, it is to be understood that the invention is not limited to those precise embodiments, and that various other changes and modifications maybe affected therein by one skilled in the art without departing from the scope or spirit of the invention.

What is claimed is:

1. A portable communication device for facilitating group communications relating to predefined discussion topics between a user and one or more participants, the portable communication device comprising:
   a full-duplex transceiver, the transceiver sending and receiving signals on a plurality of channels, the channels corresponding to respective predefined discussion topics; and
   a channel selector operatively coupled to the transceiver for selecting a particular one of the transceiver channels and a corresponding discussion topic
   wherein a user of said portable communication device can select a predefined discussion topic corresponding to the selected channel and participate in a discussion with undetermined number of participants without a need for connecting to a service provider.

2. The portable communication device of claim 1, wherein the transceiver further comprises at least one user-definable channel, the user-definable channel being assigned to a particular discussion topic by the user.

3. The portable communication device of claim 1, further comprising a processor operative to at least partially control one or more functions of the portable communication device.

4. The portable communication device of claim 3, further comprising a display operatively coupled to the processor, the display visually indicating at least one of: (i) a selected channel; (ii) a corresponding discussion topic assigned to the selected channel; and (iii) a number of users participating in the selected discussion topic.

5. The portable communication device of claim 1, further comprising voice recognition circuitry operatively coupled to the transceiver, the voice recognition circuitry being responsive to one or more audio input signals and at least partially controlling the transceiver for transmitting the audio input signals to the one or more participants.

6. The portable communication device of claim 5, wherein the voice recognition circuitry is further operative to at least partially control the channel selector in response to the one or more audio input signals.

7. The portable communication device of claim 1, further comprising:
   menu circuitry operatively coupled to at least one of the transceiver and the channel selector, the menu circuitry providing an interface for indicating to a present setting of one or more predetermined functions of the portable communication device and for modifying the one or more predetermined functions; and
   an indicator operatively coupled to the menu circuitry for indicating the one or more predetermined functions of the portable communication device.

8. The portable communication device of claim 1, wherein the transceiver further comprises:
   an input for being operatively coupled to a microphone transducer;
   an output for being operatively coupled to an earpiece transducer; and
   an antenna connection for being operatively coupled to an antenna.

9. The portable communication device of claim 1, further comprising an on-line indicator, the on-line indicator being responsive to at least one of (i) a participant entering a selected channel and (ii) a participant leaving the selected channel, the on-line indicator providing an indication in response thereto.

10. A mobile community communication system for facilitating group communications relating to predefined discussion topics between a plurality of participants, the mobile community communication system comprising:
    a plurality of mobile communicator units, each of the mobile communicator units including:
       a full-duplex transceiver, the transceiver sending and receiving signals on a plurality of channels, the channels corresponding to respective predefined discussion topics; and
       a channel selector operatively coupled to the transceiver for selecting a particular one of the transceiver channels and a corresponding discussion topic
    wherein a user of each of the portable communication units can select a predefined discussion topic corresponding to the selected channel and participate in a discussion with undetermined number of participants without a need for connecting to a service provider.

11. The system of claim 10, wherein each of the mobile communicator units further comprise:
    at least one user-definable channel, the user-definable channel being assigned to a particular discussion topic by one of the participants.

12. The system of claim 10, wherein each of the mobile communicator units further comprises a processor operative to at least partially control one or more functions of the mobile communicator unit.

13. The system of claim 12, wherein each of the mobile communicator units further comprises a display operatively coupled to the processor, the display visually indicating at least one of: (i) a selected channel; (ii) a corresponding discussion topic assigned to the selected channel; and (iii) a number of users participating in the selected discussion topic.

14. The system of claim 10, wherein each of the mobile communicator units further comprises voice recognition circuitry operatively coupled to the transceiver, the voice recognition circuitry being responsive to one or more audio input signals and at least partially controlling the transceiver for transmitting the audio input signals to the plurality of participants.

15. The system of claim 14, wherein the voice recognition circuitry is further operative to at least partially control the channel selector in response to the one or more audio input signals.

16. The system of claim 10, wherein each of the mobile communicator units further comprise:

menu circuitry operatively coupled to at least one of the transceiver and the channel selector, the menu circuitry providing an interface for indicating a present setting of one or more predetermined functions of the portable communication device and for modifying the one or more predetermined functions; and an indicator operatively coupled to the menu circuitry for indicating the one or more predetermined functions of the mobile communicator unit.

17. The system of claim 10, wherein the transceiver in each mobile communicator unit further comprises:

an input for being operatively coupled to a microphone transducer;

an output for being operatively coupled to an earpiece transducer; and an antenna connection for being operatively coupled to an antenna.

18. A method of facilitating group communications relating to predefined discussion topics between a user and one or more participants, the method comprising the steps of:

providing a plurality of portable communication devices, each of the portable communication devices being capable of transmitting and receiving signals on a plurality of channels, the channels corresponding to respective predefined discussion topics;

selecting one of the channels on which to initiate and/or participate in a discussion relating to the predefined discussion topic corresponding the selected channel enabling a user of each of said plurality of portable communication devices to select a predefined discussion topic corresponding to the selected channel and participate in a discussion with undetermined number of participants without a need for connecting to a service provider.

19. The method of claim 18, further comprising the step of:

at least partially automating one or more portable communication devices in response to at least one of voice communication and sounds.

* * * * *

UNITED STATES PATENT AND TRADEMARK OFFICE
CERTIFICATE OF CORRECTION

PATENT NO. : 6,941,372 B2
DATED : August 6, 2005
INVENTOR(S) : Anthony Pearson

It is certified that error appears in the above-identified patent and that said Letters Patent is hereby corrected as shown below:

Column 7,
Line 54, after the word "topic" insert -- ; --.

Column 8,
Line 55, after the word "topic" insert -- ; --.

Column 10,
Line 19, after the word "channel" insert -- ; and --.

Signed and Sealed this

First Day of November, 2005

JON W. DUDAS
*Director of the United States Patent and Trademark Office*